July 28, 1959 P. J. W. JOCHEMS 2,897,429
SUPPLY CIRCUIT TRANSISTOR CURRENT CONTROL FOR ELECTRIC LOADS
Filed June 7, 1954 2 Sheets-Sheet 1
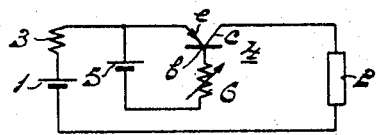
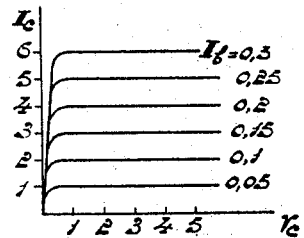
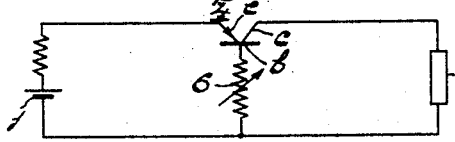
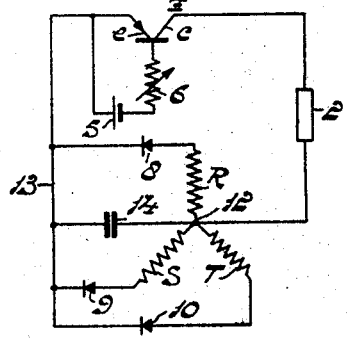
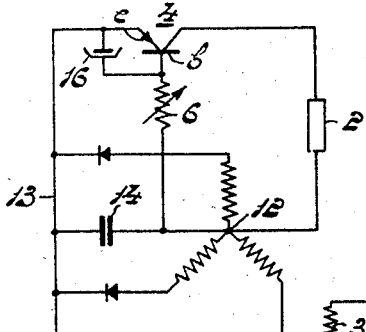
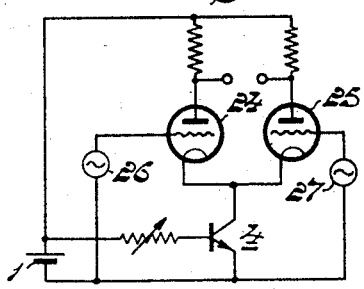
INVENTOR
PIETER JOHANNES WILHELMUS JOCHEMS
BY Fred M Vogel
AGENT United States Patent Office 2,897,429
Patented July 28, 1959

2,897,429

SUPPLY CIRCUIT TRANSISTOR CURRENT CONTROL FOR ELECTRIC LOADS

Pieter Johannes Wilhelmus Jochems, Eindhoven, Netherlands, assignor, by mesne assignments, to North American Philips Company, Inc., New York, N.Y., a corporation of Delaware Application June 7, 1954, Serial No. 434,899

Claims priority, application Netherlands June 19, 1953

9 Claims. (Cl. 323—4)

The invention relates to a supply circuit arrangement for an electric load supplied from a supply source. More particularly the object of the invention is to provide a supply circuit arrangement in which the supply current is substantially independent of variations in the supply voltage or of variations in the load impedance respectively.

A supply circuit arrangement for an electric load according to the invention is characterized in that the emitter-collector path of a transistor is connected in series in the circuit connecting the supply to the load and a substantially constant current is supplied to the base of said transistor, permitting substantially the whole voltage of the supply source to be made available to the load.

The invention will now be described with reference to the accompanying diagrammatic drawing, in which some embodiments thereof are shown by way of example, and in which—

Fig. 1 shows the principle of the invention,

Fig. 2 shows a family of curves of a transistor,

Figure 8:
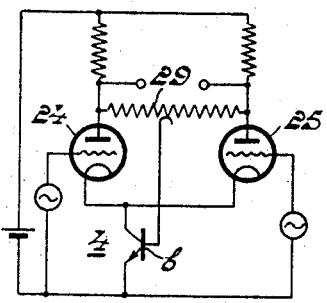
Figure 9:
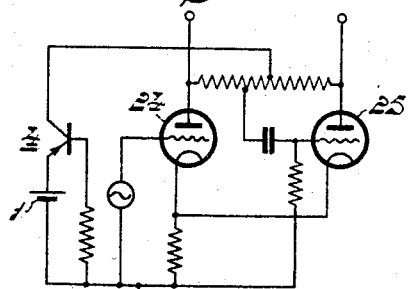
Figure 10:
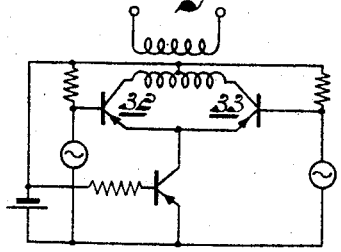

Fig. 3 shows a modification of a circuit arrangement of the kind shown in Fig. 1, Fig. 4 shows a circuit arrangement according to the invention for use in combination with a supply rectifier arrangement, Fig. 5 shows a modification of a circuit arrangement of the kind shown in Fig. 4, Fig. 6 shows a circuit arrangement according to the invention for use with a plurality of electric loads, Fig. 7 shows a circuit arrangement according to the invention for use with a push-pull amplifier, and Figs. 8, 9 and 10 show modifications of a circuit arrangement of the kind shown in Fig. 7.

Referring now to the figures, Fig. 1 shows a supply circuit comprising a supply source 1 and an electric load 2, for example, a tube amplifier, a transistor amplifier, a cathode-ray tube, an electron microscope or the like. The supply source 1 exhibits a comparatively low impedance 3 and may be subjected to variations with the result that, if no further steps are taken, the supply current to the load 2 also varies. Similarly, the supply current will vary if the load 2 exhibits a variable impedance.

According to the invention the series circuit connecting the supply source 1 to the load 2 includes the emitter-collector path $e$—$c$ of a transistor 4, which is preferably a junction transistor. A constant base current is supplied to the base $b$ of the transistor 4 by means of an auxiliary supply 5. The value of the supply 5, if desired, is adjustable with the aid of a variable resistance 6.

The invention is based on recognition of the fact that the collector current $I_c$ of a transistor as a function of the collector voltage $V_c$ is already substantially constant at a constant base-current $I_b$ from a very slight potential difference $V_c$ between the collector and the emitter. Fig. 2 shows the $I_c$—$V_c$ characteristic curves of a transistor, more particularly a junction transistor, for different values of the base-current $I_b$. From this it will be seen that already from a voltage $V_c$ of the collector $c$ relatively to the emitter $e$ of value of one or a few volts the collector current $I_c$ substantially does no longer vary with the collector voltage $V_c$.

Consequently the transistor 4 in the arrangement according to the invention acts as a very large ballast resistance of, for example, a few megohms for current variations of the supply current supplied to the load 2. For the said current variations, the load 2 generally exhibits an appreciably lower impedance which, if so required, may be additionally reduced by a capacitor or, for example, a neon tube connected in parallel therewith. Nevertheless the direct voltage loss across the transistor 4 can be kept very slight with the result that substantially the entire voltage of the supply source 1 remains available to the load 2.

If in the arrangement shown in Fig. 1 the supply source 1 varies slightly or slowly only, the separate auxiliary supply source 5 can usually be dispensed with by connecting the lower side of the base resistor 6 directly to one terminal of the supply 1. This results in the arrangement shown in Fig. 3 in which one terminal of the supply source 1 is connected to the emitter $e$ of the transistor 4, while the other terminal of the supply 1 is connected through the base resistor 6 to the base $b$ of the transistor 4 and also to one terminal of the load 2, the other terminal of the load 2 being connected to the collector $c$ of the transistor 4.

Fig. 4 shows a supply circuit in which the supply voltage is supplied by means of rectifiers 8, 9, 10; the voltages of a three-phase power main R, S, T are rectified so that between a mutual point 12 and a lead 13 a pulsatory direct voltage is generated which, if desired, may be additionally slightly smoothed with the aid of a capacitor 14. This supply voltage is again supplied to the load 2 through the emitter-collector path $e$—$c$ of the transistor 4, the base-current of the transistor 4 being adjusted to a constant value in a manner similar to that used in the arrangement shown in Fig. 1 by means of an auxiliary supply source 5 and a resistor 6 which may be adjustable.

In a similar manner, a supply current obtained by full-wave rectification of a single-phase or a three-phase voltage may be stabilized. In this event the capacitor 14 may usually be omitted.

Fig. 5 shows a modification of an arrangement of the kind shown in Fig. 4 in which the auxiliary supply 5 has been dispensed with in spite of the fact that the voltage produced between the points 12 and 13 can still vary appreciably, in that this voltage is supplied via the base resistor 6 to the base $b$ of the transistor 4 and a smoothing capacitor 16 is included between the electrodes $b$ and $e$. The resistor 6 usually is comparatively large at useful values of the base current while the capacitor 16, for example an electrolytic capacitor, is inserted between two points exhibiting a very slight potential difference, for example 0.1 volt. A very effective stabilization of the base current of the transistor 4, and consequently of the supply current to the load 2, is thus achieved by much cheaper means than if the capacitor 14, which is connected between two points exhibiting a large potential difference, has the large value required for such stabilization.

Fig. 6 shows an arrangement in which a number of loads 17, 18, 19 having variable impedances are supplied from the same supply source 1 via transistors 4, 4', 4'' connected similarly to the transistor shown in Fig. 3. In the embodiment shown the load 18 is an electron tube amplifier for the amplification of the signal of a source 20. The shown manner of connecting the transistor 4' between the source 1 and the said amplifier 18 permits the use of a comparatively small capacitor 21 for passing the signal currents from the source 20 without these currents setting up appreciable voltages across the impedance 3 of the supply source 1. The load 19 is similarly shown as a transistor amplifier for the amplification of the signals of the source 22. Since no corresponding signals are set up across the resistor 3 a reaction of one of these amplifiers upon the other is avoided.

Fig. 7 shows a push-pull amplifier comprising two push-pull tubes 24 and 25 the grid circuits of which include signal sources 26 and 27. The tubes 24 and 25 are supplied from the supply source 1 through a transistor 4 included in the cathode circuit of these tubes and connected in the manner already described with reference to Fig. 3. The transistor 4 offers a very high resistance to current variations with the result that between the two anodes of the tubes 24 and 25 a push-pull voltage is produced which forms the amplified difference potential between the signals of the sources 26 and 27. However, the direct voltage loss across the transistor 4, which in this event is very low, again permits the tubes 24 and 25 to be operated by substantially the entire voltage of the source 1. In addition, in the manner shown this direct voltage loss may be adjusted exactly so that no separate grid bias sources are required for the tubes 24 and 25.

Fig. 8 shows a modification of the arrangement shown in Fig. 7 in which the base b of the transistor 4 is connected to the approximate mid-point of a resistor 29 connected between the anodes of the tubes 24 and 25, in which event any in-phase component of the generated anode voltages is also counteracted.

The arrangements shown in Figs. 7 and 8 permit of obtaining a pseudo-push-pull action if the signal of one of the two signal sources is equal to zero. Fig. 9 shows an alternative pseudo-push-pull arrangement in which the transistor 4 is included in the common anode circuit of the push-pull tubes 24 and 25, the tube 25 being controlled from the anode circuit of the tube 24. Any in-phase component of the push-pull voltages produced between the anodes of the tubes 24 and 25 is in this event again counteracted in that the transistor 4 offers a high impedance; nevertheless, due to the slight direct voltage loss across the transistor 4 the supply voltage supplied to the tubes 24 and 25 is again substantially equal to the entire voltage of the supply source 1.

Fig. 10 shows an alternative modification of the arrangement shown in Fig. 7, in which the tubes 24 and 25 are replaced by transistors 32 and 33 which operate in a manner fully analogous to that shown in Fig. 7. Generally the tubes 24 and 25 may be replaced by any suitable amplifier elements provided that their alternating current resistance is kept small relative to the apparent emitter-collector resistance of the transistor 4.

What is claimed is:

1. An electrical circuit arrangement comprising a current source, a load, and means for supplying a substantially constant current from said source to said load, said means comprising a junction transistor having an emitter electrode and a collector electrode connected in series between said source and said load and having a base electrode, said emitter electrode being connected to said current source and said collector electrode being conneted to said load said transistor being characterized by a substantially constant collector current as determined by the base current thereof substantially independently of the voltage applied to said collector electrode, and means for supplying a constant current to said base electrode.

2. An electrical circuit arrangement as claimed in claim 1, wherein said last-mentioned means comprises a variable impedance element connected in the circuit of said base electrode for varying the current supplied to said load.

3. An electrical circuit arrangement comprising a current source, a load, and means for supplying a substantially constant current from said source to said load, said means comprising a junction transistor having an emitter electrode and a collector electrode connected in series between said source and said load and having a base electrode said emitter electrode being connected to said current source and said collector electrode being connected to said load, said transistor being characterized by a substantially constant collector current as determined by the base current thereof substantially independently of the voltage applied to said collector electrode, and means for supplying a constant current to said base electrode comprising an impedance element connected between said base electrode and the common junction of a terminal of said current source and said load, the other terminal of said current source being connected to said emitter electrode.

4. An electrical circuit arrangement comprising a current source, a plurality of loads, and means for supplying a substantially constant current from said source to each of said loads, said means comprising a plurality of junction transistors each having an emitter electrode and a collector electrode connected in series between said source and each of said loads and each having a base electrode, one terminal of said current source being connected to each of said emitter electrodes, each of said transistors being characterized by a substantially constant collector current as determined by the base current thereof substantially independently of the voltage applied to each said collector electrode, and means for supplying a constant current to each of said base electrodes.

5. An electrical circuit arrangement as claimed in claim 4, wherein said last-mentioned means comprises a variable impedance connected between each of said base electrodes and the other terminal of said current source for varying the current supplied to each of said loads.

6. An electrical circuit arrangement comprising a current source, a load comprising a push-pull amplifier having a common input circuit and an output circuit, and means for supplying a substantially constant current from said source to said load, said means comprising a junction transistor having an emitter electrode and a collector electrode connected in series between said source and said load and having a base electrode, said transistor being connected tin the common input circuit of said load and being characterized by a substantially constant collector current as determined by the base current thereof substantially independently of the voltage applied to said collector electrode, said emitter electrode being connected to said current source and said collector electrode being connected to said common input circuit, and means for supplying a constant current to said base electrode comprising a variable impedance element connected between said base electrode and the common junction of a terminal of said currrent source and said load, the other terminal of said current source being connected to said emitter electrode.

7. An electrical circuit arrangement comprising a current source, a load comprising a push-pull amplifier having a common input circuit and an output circuit comprising a resistive element connected between the output terminals thereof, and means for supplying a substantially constant current from said source to said load, said means comprising a junction transistor having an emitter electrode and a collector electrode connected in series between said source and said load having a base electrode, said emitter electrode being connected to said current source and said collector electrode being connected to said common input circuit, said transistor being connected in the common input circuit of said load and being characterized by a substantially constant collector current as determined by the base current thereof substantially independently of the voltage applied to said collector electrode, and means for supplying a constant current to said base electrode comprising a connection between said base electrode and a point on said resistive element.

8. An electrical circuit arrangement comprising a current source, a load comprising an amplifier having an input circuit, a first stage connected to said input circuit, a second stage connected to the output of said first stage, and a common output circuit between said first and second stages, and means for supplying a substantially constant current from said source to said load, said means comprising a junction transistor having an emitter electrode and a collector electrode connected in series between said source and said load and having a base electrode, said emitter electrode being connected to said current source and said collector electrode being connected in the common output circuit of said load, said transistor being characterized by a substantially constant collector current as determined by the base current thereof substantially independently of the voltage applied to said collector electrode, and means for supplying a constant current to said base electrode comprising an impedance element connected between said base electrode and the common junction of a terminal of said current source and said load, the other terminal of said current source being connected to said emitter electrode.

9. An electrical circuit arrangement comprising a current source having a common terminal and a plurality of output terminals, a load, and means for supplying a substantially constant current from said source to said load, said means comprising a junction transistor having emitter, collector and base electrodes, said emitter and collector electrodes being connected in series between said source and said load, said collector electrode being connected to one side of said load, the other side of said load being connected to said common terminal, said base electrode being connected through a resistor to said common terminal, said emitter electrode being connected to said plurality of output terminals, said base electrode being further connected through a capacitor to said emitter electrode, said transistor being characterized by a substantially constant collector current as determined by the base current thereof substantially independently of the voltage applied to said collector electrode.

References Cited in the file of this patent

UNITED STATES PATENTS

| | | |
|---|---|---|
| 2,576,056 | Wannamaker | Nov. 20, 1951 |
| 2,585,078 | Barney | Feb. 12, 1952 |
| 2,663,806 | Darlington | Dec. 22, 1953 |
| 2,663,830 | Oliver | Dec. 22, 1953 |
| 2,693,568 | Chase | Nov. 2, 1954 |
| 2,698,416 | Sherr | Dec. 28, 1954 |
| 2,730,576 | Caruthers | Jan. 10, 1956 |
| 2,790,132 | Gilbert | Apr. 23, 1957 |